United States Patent [19]
Rosenvold

[11] 3,819,082
[45] June 25, 1974

[54] TRUCK BOX COVER DEVICE

[76] Inventor: Leo Rosenvold, Wildrose, N. Dak.

[22] Filed: Jan. 28, 1972

[21] Appl. No.: 221,595

[52] U.S. Cl............................. 220/24 R, 296/100
[51] Int. Cl........................................... B65d 43/00
[58] Field of Search............... 220/24 R, 41; 217/62; 296/98, 100; 160/272, 271, 270, 268, 23, 309

[56] References Cited
UNITED STATES PATENTS

| | | | |
|---|---|---|---|
| 2,898,147 | 8/1959 | Horner................................. | 296/98 |
| 3,179,464 | 4/1965 | McBurney et al.................. | 296/100 |
| 3,366,414 | 1/1968 | Thompson et al.................. | 296/100 |
| 3,667,802 | 6/1972 | Love..................................... | 296/98 |

*Primary Examiner*—William I. Price
*Assistant Examiner*—Steven M. Pollard
*Attorney, Agent, or Firm*—Robert E. Kleve

[57] ABSTRACT

The invention comprises a grain box cover device. The grain box cover device has a roller mounted along one side of the upper edge of a grain box. A sheet canvas is rolled onto the roller. A pair of rods are mounted below the upper edge of the box and have their one ends pivotally mounted to the other side of the box and extending toward the roller. The rods have their other ends terminating adjacent and beneath a lower portion of the roll of canvas. The canvas has flexible channels along its outer side edges which receive the outer end of the rods. Rope and pulling means are provided for pulling the front outer edge of the canvas across the top of the grain box in a direction toward the pivotal mounting of the rods, with the channel portions of the canvas sliding along the rods. The rods act to hold the outer side edges of the canvas below the upper edge of the box for effective closing of the box.

2 Claims, 4 Drawing Figures 3,819,082

TRUCK BOX COVER DEVICE

This invention relates to covers more particularly, the invention relates to removable sheet truck box covers.

It is an object of the invention to provide a novel truck box cover which may be easily and rapidly operated to cover and open the top of a truck box.

It is a further object of the invention to provide a novel box cover which automatically covers a truck box and with a flexible sheet that dropes over the sides of the box to provide an effective weather tight seal and which can be easily and rapidly slid over the top of the box for opening and closing the top.

Further objects and advantages of the invention will become apparent as the description proceeds and when taken in conjunction with the accompanying drawing wherein.

Briefly stated, the invention comprises a flexible box cover device having a rectangular sheet of flexible waterproof material, said sheet being wound onto a shaft into a roll with said shaft being rotatably mounted to and extending across the rear edge of the truck box. Said rectangular sheet has its opposing side edges reversely folded to form channels along the opposing side edges of the rectangular sheet which channels extend laterally of the longitudinal axis of the shaft, said sheet when in a roll extends beyond the opposing side edges of the box whereby when the sheet is unrolled and pulled across the top of the truck box toward the front edge of the box the channels of the sheet will drop over the side edges of the box, a pair of elongated rods positioned below the upper edge of the box and mounted to the forward edge of the truck box, the rearward ends of the rods being free and extending toward the rear of the box and into the channels of the rectangular sheet at the forward outer edge of the sheet, rope means to pull the forward edge of the fabric sheet toward the forward edge of the truck box to cover the box with the channel portions of the sheet sliding onto the rods to hold the side edges of the sheet draped over the side edges of the box as the sheet unrolls from the shaft.

Figure 1:
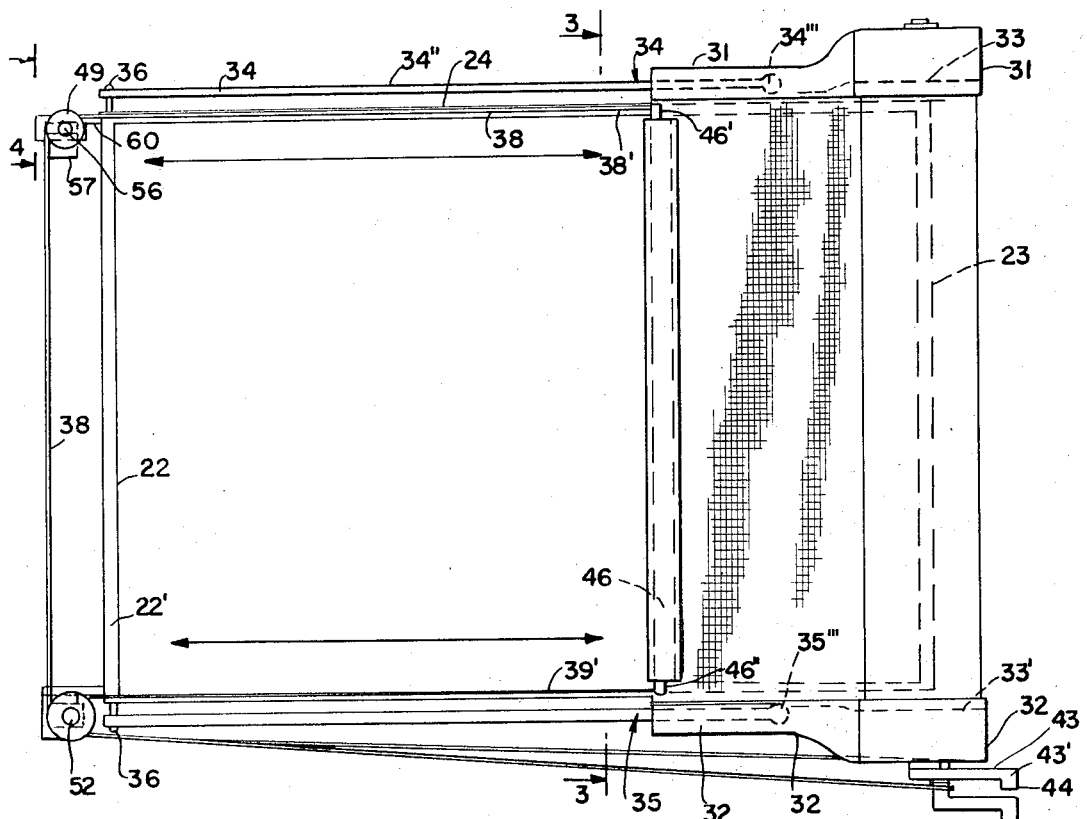
FIG. 1 is a top plan view of the removable box cover invention.

Referring more particularly to the drawing, in FIG. 1, the removable fabric box top cover invention 20 is illustrated mounted to a conventional truck box 21. The truck box 21 is a conventional type having front and rear walls 22 and 23, respectively, side walls 24 and 25, respectively and a bottom wall 26 for holding grain and other items therein.

The box top cover invention 20 has a rectangular sheet 27 of flexible waterproof material such as canvas. The sheet 27 is wrapped onto a metal shaft 28 into a roll with the inner edge of the sheet 27 fixed to the metal shaft and the outer edge 29 of the sheet extending toward the front wall of 22 of the truck box. The metal shaft is positioned over the upper edge 23' of the rear wall so that the sheet 27 when wrapped in a roll will be positioned over the top edge 23' of the rear wall.

Figure 2:
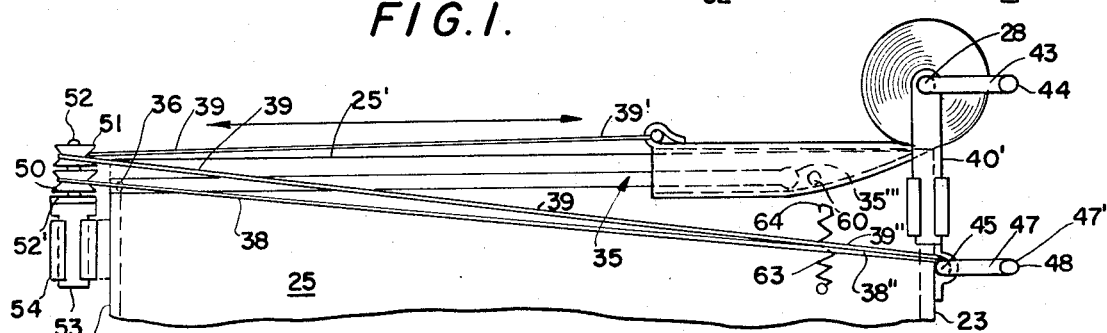
FIG. 2 is a side elevational view of the removable box cover invention.
Figure 3:
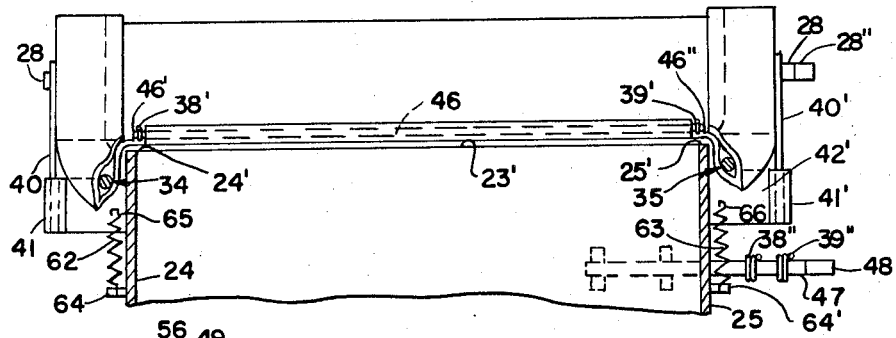
FIG. 3 is a cross-sectional view of the removable box cover invention taken along line 3—3 of FIG. 1.
Figure 4:
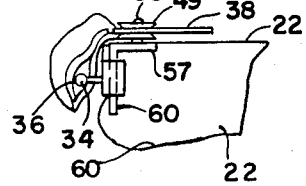
FIG. 4 is an end view taken along line 4—4 of FIG. 1.

The rectangular sheet 27 has opposing side edges 30 and 30' which are reversely folded to form channels 31 and 32 along the opposing sides of the sheet. The channels extend from the outer to the inner edge of the sheet and extend laterally of the longitudinal center axis of the shaft 28. The rectangular sheet 27 such as illustrated in FIGS. 1, 2, and 3 is wider than the box 21, so that the opposing side edges 30 and 30' extend beyond the side walls 24 and 25, when the sheet is in a roll as illustrated in FIGS. 1, 2, and 3 and whereby when the sheet 27 is unrolled and pulled forward across the top of the box, the channels 31 and 32 of the side edges 30 and 30' will drape over the top edge 24 and 25' of the side wall. The folded over edge 30 and 30' of the sheet 27 is sewn together along the dashed lines 33 and 33', respectively to form the channels 31 and 32.

A pair of elongated steel rods 34 and 35 extends along the out side surfaces of the side walls 24 and 25, respectively and are positioned below the top edges 24' and 25' of the side walls. The forward ends 34' and 35' of the steel rods are pivotally mounted to the outside surfaces 24'' and 25'' of the side wall by a pair of bolts 36 and 36' which extend through the rods 34 and 35 and through spacer metal sleeves 37, and are fixed to the side walls 24 and 25. The sleeve 37 evenly spaces the rods 34 and 35 away from the side walls 24 and 25 a short distance and the rods 34 and 35 are rotatably mounted on the bolts 36 and 36', whereby the rods 34 and 35 may pivot upward and downward about the bolts 36 and 36' relative to the box 21.

The intermediate portions 34'' and 35'' rearward ends 34''' and 35''' of the rods are free of the box 21 and the rearward ends 34'''' and 35'''' are free to be received in the channels 31 and 32 of the sheet 27. The rearward ends 34'''' and 35'''' of the rod are also rounded to facilitate te expantion channel portions 31 and 32 of sheet 27 to slide the channel portions onto the rods 34 and 35.

A pair of ropes 38 and 39 are provided to pull the forward edge 29 of the sheet 27 forward toward the front upper edge 22' of the box to cover the box with the channel poritons 31 and 32 sliding onto and along the rods 34 and 35 as the sheet 27 unrolls from the shaft and with the rods 34 and 35 holding the 30 and 30' edges of the sheet 27 draped over the upper side edges 24' and 25' of the box for sealing the truck box.

The outer ends 28' and 28'' of the metal shaft 28 are rotatably mounted in bores in upright plates 40 and 40', respectively. The upright plates 40 and 40' are slidably mounted in generally C-shaped guideways 41 and 41', respectively. The guideways 41 and 41' are fixed to a pair of projecting plates 42 and 42', respectively, and the plates 42 and 42' in turn are fixed to the side walls 24 and 25, respectively, adjacent the rear wall 23.

The upright plate 40 and 40' being slidably in the guideways 41 and 41' enable the shaft 28 to slide up and down relative to the truck box as the sheet member 27 is rolled and unrolled on the shaft 28, with the sliding movement of the shaft 28 adjusting for the varying difference in diameter of the rolled portion of sheet on the shaft 28, so that the rolled portion will constantly rest upon the upper edge 23' of the rear wall as the sheet 27 is rolled and unrolled so that the sheet provides a seal over the rear edge 23' of the box. The weight of the rolled portion of the sheet 27 and the shaft will maintain the roll portion resting on the top edge 23'.

The pulling of the rod 46 forward pulls the forward edge 29 of the sheet 27 forward which causes the sheet 27 to unroll from the shaft 28, with the shaft 28 rotating as the sheet unrolls.

The pulling of the forward end 29 of the sheet forward causes the channel portions 31 and 32 along the sheet of the sheet to slide onto the rods 34 and 35, and the rods 34 and 35 cause the outer side edges 30 and 30' of the sheet to fold down over the edges of the box as they leave the roll by the channel portions 31 and 32 of the side edges sliding onto the rods 34 and 35. The rods 34 and 35 maintain the side edges 30 and 30' of the sheet draped or folded over the edge of the box and the sheet 27 will be slid forward by the pulling of the rod with the channel portions 31 and 32 sliding over the intermediate portions 34'' and 35'' of the rods 34 and 35 to the forward ends of the rods 34 and 35.

The shaft 28 has a laterial arm 43 fixed to the one end 28'' and projecting laterally therefrom and a handle 44 fixed to the outer end 43' of the arm and projecting parallel to the axis of the shaft 28.

A second shaft 45 is rotatably mounted to the rear wall 23 of the box by means of a pair of brackets 46 and 46' The second shaft 45 also has a lateral arm 47 fixed to the outer end 45 of the shaft and projecting laterally therefrom and a second handle 48 is fixed to the outer end 47' of the arm 47 and projecting parallel to the axis of the shaft 45.

A metal rod 46 extends along the forward edge 29 of the sheet and a forward edge 29 is reversely folded to enclose the metal rod and sewn along dash lines 47 to release the rod in the fold or channel formed thereby.

The rope 38 has its one end 38' fixed to one end 46' of the metal rod 46 and the rope 38 extends forwardly from its one end around a pulley 49 and around pully 50 and its other end 38'' is fixed to the outer end 45' of the shaft 45.

The rope 39 has its one end 39' fixed to the other end 46'' of the metal rod 46 and the rope 39 extends forwardly from its one end around pulley 51 and back to the shaft 45 with its other end 39'' fixed to the shaft 45.

The pulleys 50 and 51 are rotatably mounted to a horizontal plate 52' by means of a pin 52 which is extended through pulleys 50 and 51 and is fixed to the plate, with the pulleys being rotatably mounted on the pin 52 and a vertical plate 53 extends vertically from the horizontal plate and is fixed thereto. The vertical plate 53 is slidably mounted in a C-shaped guideway plate 54. The guideway plate 54 has a vertical support plate 55 fixed thereto which extends to the front wall 22 and is fixed to the front wall to fix the guideway 54 to the front wall.

The pulley 49 is similarly mounted to the front of the truck box. A pin 56 rotatably mounts the pulley 49 to a horizontal plate 57. A vertical plate 58 extends vertically from the horizontal plate 57 and is fixed thereto. The vertical plate 58 is slidally mounted in a C-shaped guideway 59. The guideway 59 has a vertical support plate 60 fixed thereto which extends to the front wall 22 and is fixed to the front wall to fix the guideway 59 to the front wall.

OPERATION

The flexible fabric cover invention 20 operates as follows:

FIGS. 1, 2, and 3 illustrated the open top of the truck box 21 as being substantially uncovered by the fabric sheet member substantially rolled up on the shaft 28.

To cover the open top of the box, the operator will grasp the handle 48 and rotate the handle 48 clockwise when viewed from FIG. 2 which winds the ends 38'' and 39'' of the rope 38 and 39 onto the shaft 45 pulling the other end 38' and 39'' of the rope forward thereby pulling the rod 46 and forward edge 29 of the sheet 27 forward in the direction of the arrows.

The lateral rod 46 being made of sheet will be relatively rigid and will keep the front edge 29 of the sheet 27 straight as the front edge 29 is pulled forward by the edges. The edges of the canvas of sheet member 27, immediately beneath the outer ends 46' and 46'' of the rod 46 will slide along the top 24' and 25' of the box as the rod 46 moves forward.

The handle 48 will be rotated clockwise when viewed from FIG. 2 until the ropes have pulled the front edge 29 of the sheet member forward over the top edge 22' of the truck box, which thereby closes the truck box, the rear of the truck box being sealed by the rolled portion of the sheet resting upon the rear top edge 23' and the channels being draped over the sides of the box and held down by the rods 34 and 35 to close the sides of the truck box.

To remove the tarp cover the handle 44 will be rotated counterclockwise when viewed from FIG. 2, by the operator, to wind the sheet member back onto the shaft 28. The rotation of handle 44 causes the ropes 38 and 39 to unwind from handle 48 and the winding of the sheet 27 back onto the shaft 28 will cause the channel portions 32 and 33 of the sheet member to slide back off of the rods 34 and 35 and be rolled on the shaft 28 with the rest of the sheet 27. The handle 44 will be rotated counterclockwise until the forward edge 29 has returned to its original position shown in solid lines in FIG. 2.

Normally, the sheet member will not be wound onto the shaft much beyond that shown in FIG. 2 so that the channel portions of the sheet member 23 need not be removed from the rods 34 and 35 either in its open or closed position.

The box cover device 20 may be removed from the truck box by sliding the upright plates 40 and 40' out of the guideway 41 and 41' which detaches the shaft 28 from the box and sliding the upright plate 53 and 58 out of guideways 54 and 59 which removes the pulleys 49, 50, and 51, and then sliding the shaft 45 out of the bores formed by the brackets 46 and 46'. The rods 34 and 35 may also be removed by removing the bolts 36 and 36'.

Normally, the upright plates 53 and 58 can slide upward and out of the guideways from their positions shown in solid lines in FIGS. 1 and 2, but cannot slide further down from their positions shown in solid lines in FIG. 2 so as to keep the ropes in alignment with the top of the box.

The rods 34 and 35 hold the side edges of the canvas draped down over the side edges of the box in relatively watertight relation.

When the sheet member has been pulled fully forward so that the front edge 29 covers the top edge 22' of the box, for its fully closed position. A pair of eyelets or holes 61 located along the opposing channels 31 and 32 near the inner rear edge of the sheet. The sheet 27 will appear on the sheet member of the location illustrated in phantom lines 67 and in alignment with another when viewed from FIG. 2.

A pair of coil springs 62 and 63 each having their lower ends mounted to pins 64 and 64' which pins are fixed to the sides 24 and 25 of the box and the upper ends of the coil spring 62 and 63 for hooks 65 and 66. The operator will grasp the coil springs 62 and 63 expanding them and hook the hooked ends 65 and 66 into the eyelets 61 on the opposite sides of the tarp, when the tarp is fully closed. Then the release the coil spring. The coil spring will retract downward and pull the sheet member 27 down to make the rearward end of the sheet member 27 taunt over the truck box for a more effective watertight or air tight seal.

Thus, it will be seen that a novel removable fabric cover member has been provided for a truck box which holds the sides of the sheet member draped over the edges of the box for effective sealing of the tarp over the top of the box, and which fabric sheet member may be easily and rapidly removed as well as slid over the top of the box for opening and closing the top of the box.

It will be obvious that various changes and departures may be made to the invention without departing from the spirit thereof and accordingly it is not intended that the invention be limited to that specifically described in the specification as illustrated in the drawing but only as set forth in the appended claims wherein:

What is claimed is:

1. A box cover device for covering the open top of a box of a truck and the like comprising a flexible sheet member having a length and width of at least slightly greater than the length and width of the open top of the box, a pair of elongated rods, said rods having a fixed length of at least near the length of the box and extending longitudinally along the length of the box on opposite sides of the box, said rods having enlarged heads at their forward ends of greater size than the lateral thickness of the rods, said rods having their rearward ends mounted to the rearward end of the box, said sheet members having reversely folded channels along their length to receive the enlarged heads and rods with the enlarged heads facilitating the telescoping action, cable means to draw the sheet member along the length of the box and along the length of the rods in a direction toward the rearward end of the box to draw the sheet member over the box to cover the box, a drum winding means mounted to the forward end of the box forward of the enlarged heads at the forward end of the rods, and rotatable in one direction to feed the sheet member onto the rods along the length of the box by the sheet member unwinding therefrom, said drum means being rotatable in the opposite direction to wind the sheet member back onto the drum for uncovering the top of the box.

2. A box cover device for covering the open top of a box comprising a flexible sheet member having a length and width of at least slightly greater than the length and width of the open top of the box, a pair of elongated rods, said rods having a fixed length of at least near the length of the box and extending longitudinally along the length of the box on opposite sides of the box, said rods having enlarged heads at their forward ends of greater size than the lateral thickness of the rods, said rods having their rearward ends mounted to the rearward end of the box, said sheet members having channels along their length to receive the enlarged heads and rods in a telescoping action with the enlarged heads facilitating the telescoping action, means to draw the sheet member along the length of the box and along the length of the rods in a direction toward the rearward end of the box to draw the sheet member over the box to cover the top of the box, a drum winding means mounted at the forward end of the box forward of the enlarged heads, and rotatable in one direction to feed the sheet members onto the rods along the length of the box by the sheet member unwinding therefrom, said drum means being rotatable in the opposite direction to wind the sheet member back onto the drum for uncovering the top of the box.

* * * * *